United States Patent
Danbrova

[15] 3,673,728
[45] July 4, 1972

[54] FISH LURE
[72] Inventor: Roger G. Danbrova, 1206 South 11th Street, Manitowoc, Wis. 54220
[22] Filed: April 29, 1971
[21] Appl. No.: 138,577

[52] U.S. Cl. ...........................................................43/42.51
[51] Int. Cl. ......................................................A01k 85/04
[58] Field of Search ...............43/42.51, 42.52, 42.49, 42.18, 43/42.17

[56] References Cited

UNITED STATES PATENTS

| | | | |
|---|---|---|---|
| 2,849,826 | 9/1958 | Kjormoe | 43/42.51 |
| 2,778,145 | 1/1957 | Momb | 43/42.51 |
| 1,317,890 | 10/1919 | Patton | 43/42.51 |

Primary Examiner—Samuel Koren
Assistant Examiner—J. F. Pitrelli
Attorney—Stanley E. Binish

[57] ABSTRACT

An elongated fish lure having a 180° circumvoluted spiral body member and having an angularly projecting tail and an angularly projecting deflector head both projecting on the same side of the lure. The tail section is substantially flat and is bent outwardly and rearwardly at an angle less than 90° to the longitudinal axis of the body member. The deflector head is bent outwardly and forwardly at angle less than 90° to the longitudinal axis of the body member.

17 Claims, 6 Drawing Figures

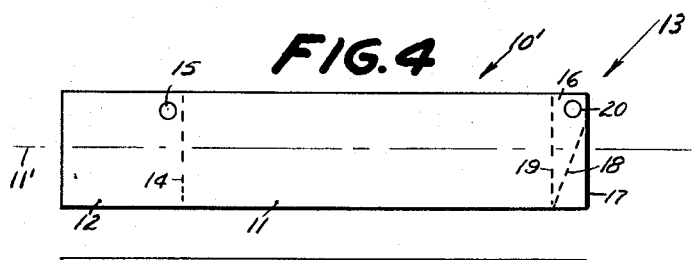
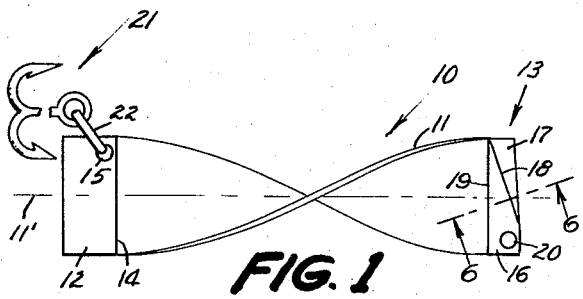
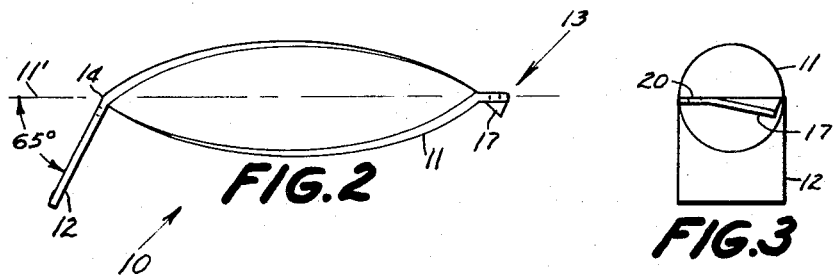
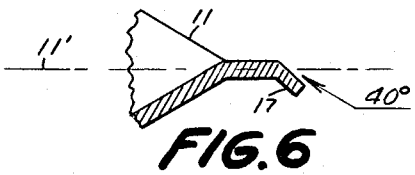
INVENTOR
ROGER G. DANBROVA
BY Stanley Bimish
ATTORNEY 3,673,728

FISH LURE

SUMMARY OF THE INVENTION

An object of this invention is the provision of an improved fish lure having a unique vibrating, spinning and spiral orbiting action which increases the fish-attracting and fish-catching effectiveness of the lure.

Another object is to provide a fish lure that reflects and flashes a maximum of light beams in a maximum of directions.

Other specific features and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a plan view of one embodiment of this invention;

FIG. 2 is a side elevation view of the fish lure shown in FIG. 1 showing the bent tail and deflector head;

FIG. 3 is an end elevation view of the fish lure shown in FIG. 2 showing the bent deflector element;

FIG. 4 is a plan view of a blank from which the fish lure of this invention is made showing its strip form;

FIG. 5 is a side elevation view of the blank shown in FIG. 4; and

FIG. 6 is an enlarged fragmentary section taken on line C–6 of FIG. 1.

Referring now to the drawings, wherein like reference characters designate like or corresponding parts throughout the several views, there is shown in FIGS. 1 and 2 a fish lure generally indicated at 10 having an elongated body 11 twisted helically or spiralled about its longitudinal axis for 180° of circumvolution, an angularly projecting rectangular flat tail 12 and an angularly projecting deflector head generally indicated at 13.

The fish lure 10 is preferably made from a predetermined rectangular length of a flat strip or flat thin bar, such as blank strip generally indicated at 10', see FIG. 4, of stainless steel metal. Such blank substantially three inches long, three-fourths inch wide, and of 18 gauge thickness has been found suitable. However, it is understood that the invention is not limited to the above specifications, as the fish lure can be made of various materials suitable for the intended purpose and of various sizes within the limits of substantially homologus design and proportions. From such strip or blank, the body section, tail section, and deflector head section, of the fish lure, are integrally formed. However, the lure can also be made of such separate members suitably joined.

The elongated helical or spiralled body section 11 terminates in an integral and continuing flat tail 12, see FIG. 2, bent or deflected to project outwardly and rearwardly from juncture 14 at an angle of substantially 65° to the longitudinal axis of said blank strip or spiralled body 11. Said tail 12 is substantially square, and is provided with an aperture at a leading juncture corner thereof, such as indicated at 15, adapted to receive and secure hook means thereto. The straight juncture line 14 intersects the longitudinal axis 11' of the spiralled body 11 substantially at right angle.

Said spiralled body 11 is also provided with an integral deflector head extension generally indicated at 13, including a flat neck 16, and a baffle or deflector 17. The flat neck 16 lies in a plane determined by the tail juncture line 14 and the longitudinal axis 11' of the spiralled body 11, said neck portion is cut off or terminates along a line or juncture 18 oblique relative to the longitudinal axis 11' of the spiralled body 11, thereby forming a substantially triangular neck portion on said body 11. The juncture line 19, at the base of neck 16, intersects the longitudinal axis 11' of the spiralled body 11 at right angle and parallel to juncture line 14.

The deflector 17 extends integrally from the oblique juncture line 18, and is bent to project outwardly and forwardly at an angle of substantially 40° to the longitudinal axis 11' of the spiralled body, and is disposed to confront the tail section, that is, it is disposed to project over and on the same side of the body section 11 as said tail section.

Fishing line securing means, such as aperture 20, is provided on the deflector head means, such as on neck 16, adjacent the leading corner or side edge thereof.

Fish hook attaching means, such as aperture 15, is provided at the leading corner of said tail section diagonally opposite said fishing line securing means 19, relative to the twisted lure.

Hook means such as indicated generally at 21 are secured to said attaching aperture by any means such as ring 22.

Operation: As the lure is pulled through the water, the spiral flights of the body react and cause the lure to rotate or spin. Because the fishing line and the fish hook are attached to the lure at diagonally opposite points on the lure, the lure spins, not on its own longitudinal axis, but more or less on an operating axis determined by a line through said diagonally opposite points.

Also, said operating axis disposes the tail section at an angle to cause it to react in a manner to deflect the lure rotatively in the same direction of rotation as the spiralled body.

Furthermore, the angularly disposed deflector, and its eccentric relation or disposition to one side of the fishing line, causes it to react in a manner to deflect the lure rotatively in the same direction of rotation as the spiralled body.

A characteristic feature of this invention is the provision of a fish lure having a spiralled body, coupled with angularly disposed and confronting deflector head and tail means, and wherein the fishing line and hook means are connected on said lure at points on the head and tail that are diagonally opposite each other, whereby the deflector and tail operate to deflect the lure in the same direction of rotation as the spiralled body.

What is claimed and desired to be protected by Letters Patent of the United States is:

1. A fish lure made from a substantially flat strip, comprising:
   a. a central body section spirally twisted substantially 180° of circumvolution about the longitudinal axis of said strip;
   b. said body section terminating at one end in a substantially flat tail section bent outwardly and rearwardly at an angle less than 90° to said longitudinal axis;
   c. said body section terminating at its other end in deflector head means including a deflector bent along a line oblique to said longitudinal axis and bent outwardly and forwardly at an angle less than 90° to said longitudinal axis,
   d. fishing line securing means provided on said deflector head means adjacent a side edge thereof; and
   e. fish hook attaching means provided at the leading corner of said tail section diagonally opposite said fishing line securing means.

2. The fish lure of claim 1 and fish hook means secured to said fish hook attaching means.

3. The fish lure of claim 1 wherein the tail section is bent outwardly and rearwardly between 55° and 75°, and the deflector is bent outwardly and forwardly between 30° and 50°.

4. The fish lure of claim 1 wherein the tail section is bent outwardly and rearwardly substantially 65°; and the deflector is bent outwardly and forwardly substantially 40°.

5. The fish lure of claim 4 wherein the deflector is adapted to deflect the lure rotatively in the same direction of rotation as the spiralled body section when drawn through water.

6. The fish lure of claim 5 wherein the deflector is disposed on the same side of said body section as said tail section.

7. The fish lure of claim 6 wherein the deflector is substantially triangular and disposed on the side of said deflector head means opposite to said fishing line securing means; and wherein the tail section is substantially square.

8. The fish lure of claim 7 wherein the deflector head means includes a flat support neck for the support of said deflector.

9. The fish lure of claim 8 and fish hook means secured to said fish hook attaching means.

10. A fish lure, comprising:

a. an elongated body member comprising helical flight means circumvolved substantially 180° about the longitudinal axis of said elongated body member;

b. a substantially flat tail section extending from one end of said body member and disposed outwardly and rearwardly at an angle less than 90° to said longitudinal axis;

c. substantially flat deflector head means extending from the other end of said body including a deflector connected to said deflector head means along a line oblique to said longitudinal axis and disposed outwardly and forwardly at an angle less than 90° to said longitudinal axis;

d. fishing line securing means on said deflector head means adjacent a side edge thereof; and e. fish hook attaching means provided at the leading corner of said tail section located on the side of the fish lure opposite said fishing line securing means.

11. The fish lure of claim 1 and fish hook means secured to said fish hook attaching means.

12. The fish lure of claim 10 wherein the tail section is disposed outwardly and rearwardly at an angle of substantially 65°; and the deflector head means is disposed outwardly and forwardly at an angle of substantially 40°.

13. The fish lure of claim 12 wherein the deflector is adapted to deflect the lure rotatively in the same direction of rotation as said helical-flight body member when drawn through water.

14. The fish lure of claim 13 wherein the deflector is disposed on the same side of said body member as said tail section.

15. The fish lure of claim 14 wherein the deflector is substantially triangular and disposed on the side of said deflector head means opposite to said fishing line securing means; and wherein the tail section is substantially square and substantially as wide as the measure of the diameter of said body member.

16. The fish lure of claim 15 wherein the deflector head means includes a flat support neck for the support of said deflector.

17. The fish lure of claim 16 and fish hook means secured to said fish hook attaching means.

* * * * *